March 26, 1935.   A. GIACHETTI   1,995,473
CABLE LAYING APPARATUS
Filed Feb. 15, 1934

INVENTOR
Alberto Giachetti
BY
Pennie, Davis, Marvin & Edmonds
ATTORNEYS

Patented Mar. 26, 1935

1,995,473

UNITED STATES PATENT OFFICE 1,995,473

CABLE-LAYING APPARATUS

Alberto Giachetti, Rome, Italy

Application February 15, 1934, Serial No. 711,357
In Italy November 15, 1933

3 Claims. (Cl. 175—376)

Underground cables, and more particularly telephone cables, are generally protected by cement tube sections sunk into the ground and cemented together thus forming a continuous tube.

The laying of the cables is generally effected by introducing one end of the cable into the open end of the tube and pulling it through by means of a rope previously placed in the tube.

The cable covering is damaged by rubbing on the bottom of the tube. It is moreover subject to damage in service owing to the deposit of filtrating or condensing water on the bottom of the tube on which they rest. Moreover the contact of the cable with the tube produces electrolysis phenomena which impair the insulation and life of the cable.

This invention relates to an arrangement of simple construction by which the laying of the cable in the protecting tube can be effected without pulling the cable along the bottom of the tube and the cable is maintained suspended on the axis of the tube during service by means of glass porcelain or like insulators.

According to this invention the cable as it advances in the tube is provided at suitable intervals with sleeves carrying radial and resilient rollers capable of rolling on the surface of the cement tube.

The traction to be applied to the cable for the laying of same is lower than in the case of a cable pulled along the bottom of the tube and any damage of the covering caused by the contact with the tube is avoided. The length of a tube section between two inspection wells is therefore greater and a small number of inspection wells is required. The cable hangs on the axis of the tube and, if the rollers are of insulating material, the covering of the cable is also insulated from the tube and no electrolysis phenomena can take place. The cable covering may therefore be of cheaper material and smaller thickness than the ordinary cables so that the additional cost of the rollers is made up.

The annexed drawing shows a constructional form of the object of this invention.

Figure 1:
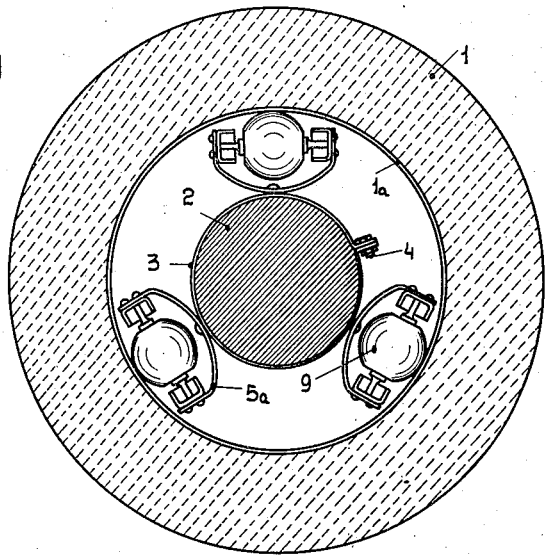
Fig. 1 is a cross section of the tube and cable, the roller support being shown in elevation.
Figure 2:
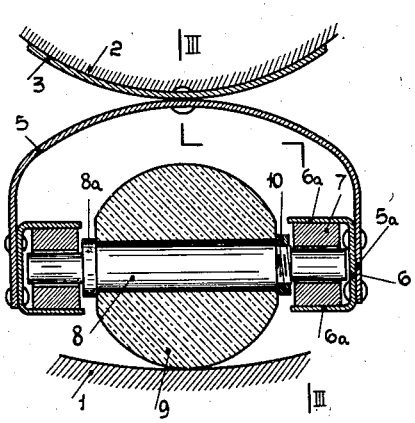
Fig. 2 is a cross section taken on the roller axis.
Figure 3:
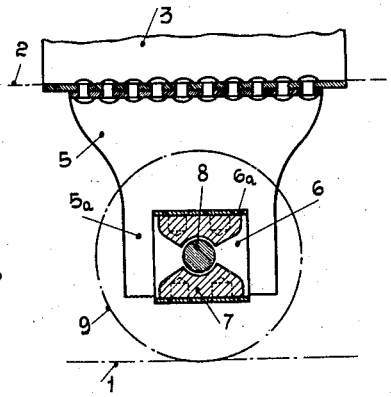
Fig. 3 is a section on the line III—III of Fig. 2.

The cable is protected by a tube of cement 1 of circular section.

The inner surface of the tube is constituted by a layer 1a of a silicate or like substance conferring to the tube a hard and smooth surface.

The cable 2 is provided at suitable intervals when it is being laid in the tube with supports constituted by a split collar 3, adapted to be clamped to the cable by means of a set screw 4. Said collar carries riveted or soldered thereto resilient forks 5.

The ends of each fork 5 form a support for each roller; a staple 6 is riveted or soldered to each end 5a and bronze half-bearings 7 are secured by means of screws to the wings 6a of said staple. The bearings carry the pin 8 of a roller 9 of spherical or like surface.

The roller is clamped between a shoulder 8a and a threaded ring 10 and may be of glass, porcelain or other suitable insulating material. The rollers serve chiefly as fixed supports and only temporarily as slowly movable supports; therefore no accurate form of their surface or of the surface of the tube 1 is required; eventual defects are compensated by the elastic deformation of the fork 5.

The supports 5 and rollers 9 allow the cable 2 to run easily within the tube 1 during the laying and the covering of the cable; it will not therefore be damaged by rubbing on the bottom of the tube; the covering can therefore be made lighter or of a material of lower strength.

In service the cable is substantially suspended on the axis of the tube and is therefore out of contact with the water deposited or flowing on the bottom of the tube; any wearing of the covering due to oxidation or electrolysis is thus prevented.

The tube sections between the inspection wells may be of greater length the cable being more easily layed in the tube and less subject to tension strains due to changes of temperature; all these advantages that is easy laying, longer life, lower cost of the cable, and smaller number of sections of the tube make up for the additional cost of the roller supports.

What I claim is:

1. An apparatus for laying electric cables in protective tubes, comprising a split collar adapted to be clamped on the cable, resilient forks fixed radially to the periphery of said collar, staples at the ends of the fork arms, bronze half-bearings in said staples and rollers of insulating material mounted capable of rotating in said half-bearings and adapted to engage the inner surface of the tube, for maintaining the cable at a distance from said surface during laying of the cable and service.

2. An apparatus for laying cables in protective tubes, comprising a split resilient collar adapted to be clamped on the cable, resilient forks radially fixed to said collar, rollers of insulating material carried by said forks and adapted to resiliently engage the inner wall of the tube in a manner such as to insure the centered position of the cable in the tube during the laying of the cable and service.

3. An apparatus for laying and holding cables in protective tubes, comprising a collar, means for securing said collar to the cable, a plurality of resilient members fastened to said collar, and insulating means arranged on said resilient members and adapted to substantially eliminate chemical influences on the cable covering, said insulating means resiliently engaging the inner surface of the protective tube.

ALBERTO GIACHETTI.